(12) United States Patent
Mori

(10) Patent No.: US 6,352,769 B1
(45) Date of Patent: Mar. 5, 2002

(54) DECORATIVE SHEET AND PROCESS FOR PRODUCING THE SAME

(75) Inventor: Yutaka Mori, Shizuoka-ken (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/403,290

(22) PCT Filed: May 21, 1998

(86) PCT No.: PCT/US98/10515

§ 371 Date: Oct. 19, 1999

§ 102(e) Date: Oct. 19, 1999

(87) PCT Pub. No.: WO98/54004

PCT Pub. Date: Dec. 3, 1998

(30) Foreign Application Priority Data

May 30, 1997 (JP) ............................................. 9-142292

(51) Int. Cl.$^7$ .............................. B44C 1/17; B44C 1/10; B41M 7/00

(52) U.S. Cl. ................. 428/354; 428/306.6; 428/315.5; 428/542.2; 428/542.6; 428/913.3; 156/77; 156/78; 156/79; 156/83; 156/273.3; 427/373

(58) Field of Search .............................. 428/354, 306.6, 428/315.5, 913.3, 542.2, 542.6; 156/77, 78, 79, 83, 273.3; 427/373

(56) References Cited

U.S. PATENT DOCUMENTS

| 5,325,781 A | * | 7/1994 | Dupont et al. | ............... 101/487 |
| 5,633,078 A | * | 5/1997 | Kamiyama | ............... 428/317.3 |
| 5,639,540 A | * | 6/1997 | Imaeda | ........................ 428/195 |

FOREIGN PATENT DOCUMENTS

| JP | 60-246878 | 12/1985 |
| JP | 63-273673 | 11/1988 |
| JP | 2295730 | 12/1990 |
| JP | 3050274 | 3/1991 |

* cited by examiner

Primary Examiner—Daniel Zirker
(74) Attorney, Agent, or Firm—Brian E. Szymanski

(57) ABSTRACT

To provide a decorative sheet which has a three-dimensional decorative effect and, in addition, is free from separation of a decorated area upon being exposed to abrasion or impact conditions. A decorative sheet comprising: a substrate (1) formed of a transparent resin composition; and, laminated thereon in the following order, a color layer (2), an expandable layer (3), and a pressure-sensitive adhesive layer (5).

7 Claims, 1 Drawing Sheet

DECORATIVE SHEET AND PROCESS FOR PRODUCING THE SAME

DETAILED DESCRIPTION OF THE INVENTION

1. Field of Utilization in Industry

The present invention relates to a decorative sheet, having irregularities, for decoration or other purposes and a process for producing the same. The decorative sheet of the present invention, by virtue of its three-dimensional decorative effect, can be advantageously used as labels, stickers, emblems, and other similar articles.

2. Prior Art

Various decorative sheets have hitherto been proposed for providing three-dimensional decoration. In most of these decorative sheets, a thermal expandable microcapsule or a similar expandable material is used in areas, of the sheets, to be decorated, and the desired decorative effect is attained as a result of expansion of the microcapsule or the like.

For example, Japanese Patent Unexamined Publication (Kokai) No. 60-246878 discloses a pattern print leather. This pattern print leather is formed by printing a pattern on the surface of a substrate film using a printing ink containing a microcapsule with a foaming agent expandable upon heating. The claimed advantage of this technique is that the need to perform embossing can be eliminated and, at the same time, it is possible to avoid misregistration, between the printed pattern and the concave or convex portions, which unavoidably occurs due to the embossing.

Japanese Patent Unexamined Publication (Kokai) No. 63-273673 discloses a three-dimensional ink comprising a binder, a colorant and a foamed microcapsule. The claimed advantage of this technique is that letters, figures or the like can be provided using the color of the ink per se.

Japanese Patent Unexamined Publication (Kokai) No. 2-295730 discloses a decorative material prepared by forming a film of a resin composition containing not more than 4% by weight, based on the total solid content, of a microcapsule type foaming agent on an opaque substrate and foaming the microcapsule type foaming agent. The claimed advantage of this technique is that the surface of the substrate is dimly seen through the film to impart mohair effect while maintaining the features, such as the three-dimensional decorative effect attained by the foamed film.

Japanese Patent Unexamined Publication (Kokai) No. 3-50274 discloses a foamable ink. This foamable ink is characterized in that ultrafine particles having high thermal conductivity or the like are incorporated into an ink containing microspheres of thermal expandable microcapsules having a particle diameter of 10 to 30 mm. The claimed advantage of this technique is that a three-dimensional image can be readily formed by mere rapid drying utilizing high frequency, resulting in enhanced profitability.

The above and other decorative sheets having irregularities, however, involve problems, to be solved, attributable to the layer construction. Specifically, a decorative sheet 20 of the above conventional type, as shown in FIG. 1 (cross-sectional view), generally has a layer construction comprising: a substrate 21; and, provided thereon in the following order, an expandable layer 23 containing a foamable microcapsule 24, a color layer 22, and a clear layer 27 or a transparent protective layer. A pressure-sensitive adhesive layer 25 with a release liner 26 is provided on the surface of the substrate 21 remote from the decoration side. According to such a layer construction, however, the color layer 22 and the clear layer 27, which protect the foamed, expanded layer 23, have no satisfactory thickness, posing a problem that, despite low cohesive force of the foamed, expanded layer 23, the decorative sheet 20 in its decorated areas (areas corresponding to the expanded layer), when it undergoes abrasion or impact during use or the like, is cracked or separated from the sheet, resulting in remarkable deterioration in appearance.

Problems to be Solved by Invention

An object of the present invention is to solve the above problems of the prior art and to provide an improved decorative sheet which can offer a three-dimensional decorative effect and is free from creation of defects, such as cracks, or separation of the decorated area from the sheet upon being exposed to abrasion, impact or other conditions.

Another object of the present invention is to provide a process for producing the above improved decorative sheet.

The above and other objects of the present invention will be easily understood from the following detailed description.

Means for Solving the Problems

According to one aspect of the present invention, the above objects can be attained by a decorative sheet having irregularities, comprising; a transparent substrate; and, laminated thereon in the following order, a color layer, an expandable layer, and a pressure-sensitive adhesive layer.

According to another aspect of the present invention, there is provided a process for producing the above decorative sheet having irregularities, comprising the steps of:

- successively laminating a color layer and an expandable layer on a transparent substrate and drying the laminate;
- applying thereon a pressure-sensitive adhesive layer with a release liner provided on the surface of the pressure-sensitive adhesive layer remote from the substrate and pressing the pressure-sensitive adhesive layer against the underlying layer including the color layer; and
- heating the whole laminate to foam the expandable layer.

According to the decorative sheet of the present invention, in particular, by virtue of partial provision of the expandable layer, that is, provision of the expandable layer in a pattern form, a three-dimensional decorative effect can be attained, and, in addition, since the color layer and the expandable layer underlies the substrate, inadvertent separation of the decorated area from the decorative sheet can be prevented upon being exposed to unfavorable external action, for example, abrasion or impact conditions.

Further, in the decorative sheet of the present invention, there has not been adopted a structure in which a substrate is disposed below an expandable layer as in the prior art-sheet, however, the substrate itself, if it is positioned above the expandable layer, has a strength sufficient to eliminate a lower support.

EMBODIMENTS OF THE INVENTION

FIG. 2 is a cross-sectional view of one preferred embodiment of the decorative sheet according to the present invention. A decorative sheet 10, as shown in the drawing, comprises: a transparent substrate 1; and, laminated thereon in the following order, a color layer 2, an expandable layer 3 containing a thermal expandable microcapsule 4, and a pressure-sensitive adhesive layer 5. A release liner 6 is provided on the surface of the pressure-sensitive adhesive layer 5 remote from the color layer 2. Further, a clear layer 7 is provided on the surface of the substrate 1 (viewer side of the decorative sheet 10). The decorative sheet of the present invention will be described in more detail based on this embodiment.

In the decorative sheet having irregularities according to the present invention, the transparent substrate serving as a base of the decorative sheet is not limited so far as it has excellent transparency and good adhesion to the underlying color layer and the clear layer covering the surface of the substrate remote from the expandable layer 3. Specifically, for the substrate, any material may be suitably selected from transparent, naturally occurring or synthetic substrate materials commonly used in the art. The substrate material, which may be advantageously used, is a resin composition which preferably has a softening point below the thermal expansion temperature of the foaming agent used in the expandable layer. Suitable resin compositions include, for example, resins such as polyvinyl chloride (PVC) and polyurethane. Especially, thin films or sheets of polyvinyl chloride and polyurethane can be advantageously used as the substrate. Although the layer thickness of the substrate is not particularly limited, it is usually about 30 to 400 $\mu$m, preferably about 50 to 300 $\mu$m. When the thickness-of the substrate is smaller than 30 gm, the production of the decorative sheet per se is difficult. On the other hand, when it exceeds 400 $\mu$m, the created irregularities are inconspicuous, resulting in indistinct three-dimensional decorative effect.

The color layer, which is first laminated on the substrate, may be constructed in the same manner as that commonly used in the field of the decorative sheet. In the practice of the present invention, preferably, the color layer is constructed of a colored resin composition. The softening point of the colored resin is preferably below the thermal expansion temperature of the foaming agent used in the expandable layer. Suitable colored resin compositions include, for example, colored polyurethane and other resins. Colorants commonly used in the art, for example, organic or inorganic pigments or dyes may be used, either alone or in any combination thereof, for coloring of the resin. The layer thickness of the color layer is not particularly limited. It, however, is generally about 5 to 50 $\mu$m, preferably about 10 to 30 $\mu$m. When the thickness of the color layer is smaller than 5 $\mu$m, the covering power of the color layer is deteriorated and, consequently, the color of the underlying layer adversely affects the decorative effect. On the other hand, when it exceeds 50 $\mu$m, the formation of the color layer per se becomes difficult.

An expandable layer is laminated onto the color layer. Preferably, the expandable layer is provided in a pattern form in association with the desired decorative effect and contains 10 to 50% by weight of a thermal expandable microcapsule.

More specifically, the expandable layer may have such a structure that the thermal expandable microcapsule is included and dispersed in the resin. The resin, in which the microcapsule is to be included, is not particularly limited. However, here again, the utilization of the above-described colored resin composition for constituting the color layer is recommended. The thickness of the expandable layer may vary depending upon various factors, such as the size, amount, and degree of expansion of the microcapsule to be dispersed within the expandable layer, the degree of the desired decorative effect and the like. The content of the thermal expandable microcapsule is preferably 10 to 50% by weight, more preferably 20 to 40% by weight, based on the total amount of the expandable layer. When the content of the microcapsule is excessively low, it is difficult to develop the three-dimensional effect in the decorated area. On the other hand, when it is excessively high, the adhesion of the expandable layer to the underlying color layer is unsatisfactory.

The thermal expandable microcapsule used in the foaming agent may be any one commonly used in the art. One example of suitable thermal expandable microcapsules is a thermal expandable microcapsule which has an expansion temperature of 100 to 180° C. and comprises an outer shell comprising a vinylidene chloride/acrylonitrile copolymer and isobutane enclosed in the outer shell. In such a microcapsule, upon heating, the outer shell is softened, and the isobutane in the interior of the shell is vaporized, causing expansion. As a result of the expansion, the area to be decorated is risen to offer the desired three-dimensional decorative effect. The above thermal expandable microcapsule is commercially available, for example, from Nihon Fillite Co., Ltd. under the trade designation "Expancel"™. The microcapsule "Expancel" has an average particle diameter of 10 $\mu$m in the unexpanded state and can be expanded to a size of about 40 $\mu$m.

Preferably, the expandable layer is formed in a pattern form on the color layer. The expandable layer may be formed on part of the color layer by various methods. However, use of screen printing, particularly silk screen printing, is advantageous. Depending upon the desired pattern, the screen used may be varied, and the mesh size thereof may also be regulated.

In the decorative sheet of the present invention, a pressure-sensitive adhesive layer is provided on the expandable layer so that the decorative sheet can be joined to an adherend. Preferably, the pressure-sensitive adhesive layer is formed of a pressure-sensitive adhesive having excellent adhesion to the expandable layer and adherends, for example, metals, plastics, woods, and resin paint surface. Suitable adhesives include, for example, acrylic resin pressure-sensitive adhesives. Although the thickness of the pressure-sensitive adhesive layer is not particularly limited, it is generally about 5 to 50 $\mu$m, preferably about 20 to 40 $\mu$m. When the thickness of the pressure-sensitive adhesive layer is excessively small, the adhesion is unsatisfactory, while when it is excessively large, it is difficult to form such a thin layer.

Provision of a release liner on the surface of the pressure-sensitive adhesive layer, which is a common practice in the art, is preferred. Release liners usable herein include a paper coated with a release agent, such as silicone resin, a substrate sheet or film of polyethylene terephthalate (PET) or the like. Preferably, the substrate sheet or film is not deformed upon expansion of the expandable layer by heating.

Further, according to the decorative sheet of the present invention, provision of a clear layer to cover the substrate on its side of a viewer is preferred for protection of the surface of the decorative sheet or other purposes. The clear layer as the outermost layer is preferably formed of a material having excellent weather resistance, water resistance and the like and good transparency. Materials suitable for the clear layer include materials having excellent adhesion to the underlying substrate, for example, colorless paints, such as fluororesin paints, thermosetting urethane paints, and ultraviolet-curable paints. The thickness of the clear layer is not particularly limited. It, however, is generally about 5 to 50 $\mu$m, preferably about 10 to 30 $\mu$m. When the thickness of the clear layer is excessively small, satisfactory weather resistance cannot be developed, while when it is excessively large, the formation of such a thick layer by coating is difficult.

By virtue of the above specific layer construction, the decorative sheet of the present invention can exhibit significant function and effect as compared with the conventional decorative sheet. For example, the conventional sheet comprises a substrate bearing an expandable layer, a color layer, and a clear layer in that order. Since the clear layer alone can function as the protective layer, the protective layer is thin, posing a problem of creation of cracking or separation in the decorated area upon being exposed to abrasion and impact conditions. In particular, such a problem is significant when the content of the thermal expandable microcapsule in the expandable layer is on a high level. By contrast, according to the present invention, the provision of the color layer and the expandable layer under the thermally softening substrate results in markedly improved protective effect and, therefore, enables the content of the thermal expandable microcapsule to be increased, realizing a better three-dimensional decorative effect.

Basically, the decorative sheet having irregularities according to the present invention may be produced by using a technique commonly used in the art, either as such or after modification according to the present invention.

More specifically, the decorative sheet of the present invention may be preferably produced by a process comprising the following steps:

1. preparation of a substrate comprising a transparent resin composition;
2. formation of a color layer on the substrate;
3. formation of an expandable layer on the color layer;
4. drying of the color layer and the expandable layer;
5. application of a pressure-sensitive adhesive layer with a release liner;
6. foaming of the expandable layer by heating; and
7. lamination of a clear layer.

A decorative sheet having an excellent three-dimensional effect can be produced via a series of steps described above. The sequence of the steps may be, if necessary, varied so far as this is not detrimental to the effect of the present invention.

EXAMPLES

The present invention will be described with reference to the following examples. However, it should be understood that the present invention is not limited to these examples only.

Example 1

Preparation of Samples 1 to 7 (comparative samples)

In this example, for comparison, a decorative sheet having a layer construction as shown in FIG. 1 was prepared.

Scotchcal™ PU-295T (brand name of a product manufactured by Sumitomo 3M Ltd.) (layer thickness 150 $\mu$m) was provided as a substrate. An expandable layer was laminated on one side of the substrate. A thermal expandable microcapsule, Expancel™ 551DU (manufactured by Nihon Fillite Co., Ltd.), was provided as a foaming agent and mixed with a polyurethane resin toner, FL510 (trade name, manufactured by Sumitomo 3M Ltd.), to concentrations specified in Table 1 (5 to 50% by weight, weight ratio 2 to 50%), and the mixture was diluted with a thinner, S/C3911 (trade name, manufactured by Sumitomo 3M Ltd.), to a viscosity suitable for coating by silk screen printing. The resultant coating liquid was coated in a desired pattern on the substrate through a 100-mesh printing plate, and the print was dried at room temperature until it became dry to the touch. Thus, an expandable layer with a microcapsule dispersed therein was formed.

Thereafter, a color layer was formed on the expandable layer. Specifically, a polyurethane resin toner, FL545 (trade name, manufactured by Sumitomo 3M Ltd.), was diluted with a thinner, S/C3911 (trade name, manufactured by Sumitomo 3M Ltd.), to a viscosity suitable for coating by silk screen printing, and the coating liquid was printed on the substrate through a 260-mesh printing plate, and the print was then dried at 85° C. or one hr. After the formation of the color layer, the laminate was dried at 120° C. for 5 min. As a result, the expandable layer was risen to create irregularities on the color layers. Finally, a clear paint, GA-7 (trade name, manufactured by Sumitomo 3M Ltd.), was printed on the color layer through a 150-mesh printing plate, and the print was dried at 85° C. for one hr. Thus, contemplated samples 1 to 7 having a layer construction as shown in FIG. 1 were prepared.

The samples 1 to 7 thus prepared were visually inspected for appearance. As a result, a three-dimensional decorative effect could be confirmed. Then, in order to evaluate whether the samples in their decorated areas are separated upon abrasion of the clear layer, each sample was placed in an abrasion tester, a rotary abrasion tester (abrasion wheel: CS-10, rotating speed 60 rpm, load 500 g), the number of abrasion operations necessary for causing the separation of the decorated area was visually determined. The results are summarized in the following Table 1.

TABLE 1

| Sample | Concentration of foaming agent (wt %) | Number of abrasion operations necessary for causing separation of decorated area |
| --- | --- | --- |
| 1 | 5 | About 750 times |
| 2 | 10 | About 750 times |

TABLE 1-continued

| Sample | Concentration of foaming agent (wt %) | Number of abrasion operations necessary for causing separation of decorated area |
|---|---|---|
| 3 | 15 | About 750 times |
| 4 | 20 | About 750 times |
| 5 | 30 | About 750 times |
| 6 | 40 | About 750 times |
| 7 | 50 | About 750 times |

The results tabulated in the above Table 1 show that, for all the samples, the decorated area was unfavorably separated in a relatively early stage.

Example 2

Preparation of Samples 8 to 14 (samples of the present invention)

In this example, a decorative sheet having a layer construction as shown in FIG. 2 was prepared.

A substrate was prepared from a thermoplastic urethane resin, Morthane PN 3429-215 (manufactured by Asahi Glass Co., Ltd.), similar to a substrate of Scotchcal™ PU-295T (brand name of a product manufactured by Sumitomo 3M Ltd.). In order to prepare the substrate, a thermoplastic urethane resin was molded by means of an extruder into a film which was provided on a release liner, thereby a 150 μm-thick sheet.

A color layer was laminated onto one side of the substrate remote from the release liner. Specifically, a polyurethane resin toner, FL545 (trade name, manufacturer by Sumitomo 3M Ltd.), was diluted with a thinner, S/C3911 (trade name, manufactured by Sumitomo 3M Ltd.), to a viscosity suitable for coating by silk screen printing. The resultant coating liquid was printed on the substrate through a 260-mesh printing plate.

Subsequent to the lamination of the color layer, an expandable microcapsule, Expancel™ 551DU (manufactured by Nihon Fillite Co., Ltd.), as a foaming agent was provided mixed with a polyurethane resin toner, FL 510 (trade name, manufactured by Sumitomo 3M Ltd.) to concentrations specified in Table 2 (5 to 50% by weight, weight ratio 2 to 50%), and the mixture was diluted with a thinner, S/C3911 (trade name, manufactured by Sumitomo 3M Ltd.), to a viscosity suitable for coating by silk screen coating. The resultant coating liquid was printed in a desired pattern on the substrate through a 100-mesh printing plate, and the print was dried at 85° C. for one hr. Thus, an expandable layer with a microcapsule dispersed therein was prepared.

Separately, a pressure-sensitive adhesive, RD-2738 (trade name, manufactured by Sumitomo 3M Ltd.), which is used in Scotchcal™ PU-295T (noted above), was coated by means of a bar coater on the release liner to a thickness on a dry basis of 45 μm, and the coating was dried at 100° C. for 3 min. The pressure-sensitive adhesive layer with a release liner provided thereon was applied to the expandable layer, with a microcapsule dispersed therein, by means of a laminator. Thereafter, the release liner covering the substrate was separated and removed, followed by drying at 120° C. for 5 min in the same manner as in Example 1 to expand the expandable layer. As a result, the expandable layer was risen to create irregularities on the color layer. Finally, a clear paint, GA-7 (trade name, manufactured by Sumitomo 3M Ltd.), was printed on the color layer through a 150-mesh printing plate, and the print was dried at 85° C. for one hr. Thus, contemplated samples 8 to 14 having a layer construction as shown in FIG. 2 were prepared.

The samples 8 to 14 thus prepared were visually inspected. As a result, a three-dimensional decorative effect superior to that for the samples 1 to 7 could be confirmed. Then, in order to evaluate whether the samples in their decorated areas are separated upon abrasion of the clear layer, each sample was placed in an abrasion tester, a rotary abrasion tester (abrasion wheel: CS- 10, rotating speed 60 rpm, load 500 g), the number of abrasion operations necessary for causing the separation of the decorated area was visually determined. The results are summarized in the following Table 2.

TABLE 2

| Sample | Concentration of foaming agent (wt %) | Number of abrasion operations necessary for causing separation of decorated area |
|---|---|---|
| 8 | 5 | Not separated after abrasion operation by 10,000 times or more |
| 9 | 10 | Not separated after abrasion operation by 10,000 times or more |
| 10 | 15 | Not separated after abrasion operation by 10,000 times or more |
| 11 | 20 | Not separated after abrasion operation by 10,000 times or more |
| 12 | 30 | Not separated after abrasion operation by 10,000 times or more |
| 13 | 40 | Not separated after abrasion operation by 10,000 times or more |
| 14 | 50 | Not separated after abrasion operation by 10,000 times or more |

The results tabulated in the above Table 2 shows that, according to the invention, the provision of a clear layer on an abrasion-resistant thick substrate prevents the decorated area from being separated from the decorative sheet hen exposed to severe abrasion conditions.

Example 3

The procedure of Example 2 was repeated, except that, in order to evaluate the influence of the layer thickness of the substrate on the decorative effect, as shown in the following Table 3, the layer thickness of the substrate was changed from 150 μm to 20 μm, 50 μm, 300 μm, and 450 μm. The results of the evaluation are summarized in Table 3.

TABLE 3

| Layer thickness of substrate (μm) | Appearance (irregularities) | Preparation of sample |
| --- | --- | --- |
| 20 | — | Substrate separated from release liner at the time of printing, making it impossible to prepare sample |
| 50 | Irregularities created in areas corresponding to expanded layer; good appearance | Possible to prepare sample without any problem |
| 150 | Irregularities created in areas corresponding to expanded layer; good appearance | Possible to prepare sample without any problem |
| 300 | Irregularities created in areas corresponding to expanded layer; good appearance | Possible to prepare sample without any problem |
| 450 | Indistinct border of expanded layer | Possible to prepare sample without any problem |

As can be seen from the results tabulated in the above Table 3, the layer thickness of the substrate is preferably in the range of from about 50 to 300 μm. In the case of a layer thickness of 20 μm, the nerve of the substrate per se was unsatisfactory.

Effect of the Invention

As is apparent from the foregoing description, the present invention can provide a decorative sheet which, in use, can be freely applied to various places and, at the same time, exhibits an excellent three-dimensional decorative effect. Further, in this decorative sheet, the decorated area, which creates the decorative effect, is covered and protected by two layers, i.e., a transparent substrate-and a clear layer, preventing not only creation of defects in the decorated area, such as cracks, but also separation of the decorated area upon being exposed to abrasion or impact conditions. Therefore, the decorative sheet of the present invention can be advantageously used in a wide variety of fields.

DESCRIPTION OF REFERENCE NUMERALS

Figure 1:
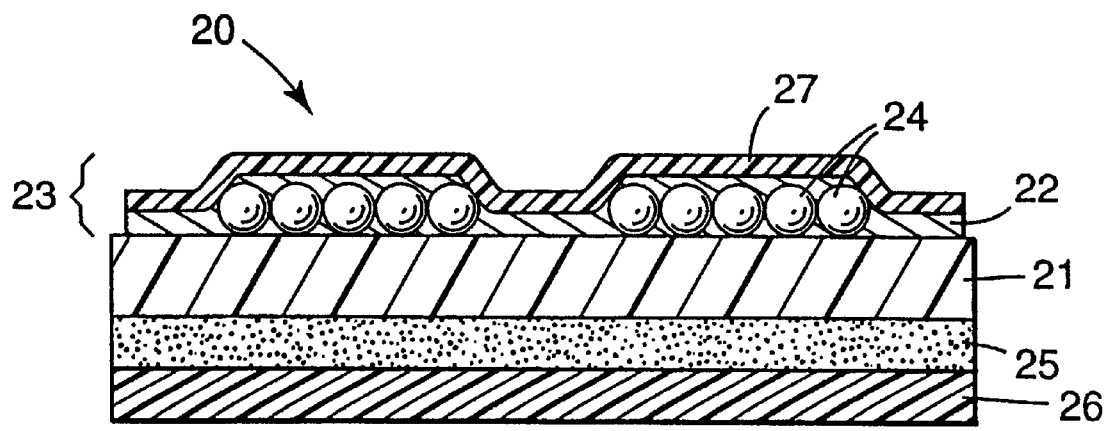
FIG. 1 is a cross-sectional view showing one example of the conventional decorative sheet.
Figure 2:
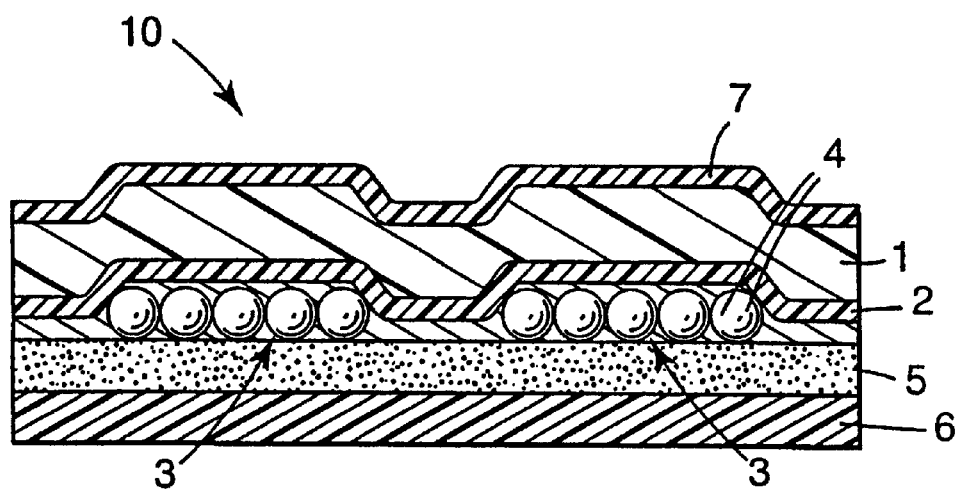
FIG. 2 is a cross-sectional view showing one preferred embodiment of the decorative sheet according to the present invention.

1 . . . substrate,
2 . . . color layer,
3 . . . expandable layer,
4 . . . thermal expandable microcapsule,
5 . . . pressure-sensitive adhesive layer,
6 . . . release liner,
7 . . . clear layer, and
10 . . . decorative sheet.

What is claimed is:

1. A decorative sheet having a three-dimensional pattern comprising; a transparent substrate; and, laminated thereon in the following order, a color layer, an expandable layer in the form of a pattern, and a pressure-sensitive adhesive layer.

2. A decorative sheet according to claim 1, wherein the expandable layer is provided in the form of a pattern and contains 10 to 50% by weight of thermal expandable microcapsules.

3. The decorative sheet according to claim 2, wherein the pattern of the expandable layer has been formed by screen printing.

4. The decorative sheet according to any one of claims 1 to 3, wherein the substrate has a layer thickness of 50 to 300 μm.

5. The decorative sheet according to any one of claims 1 to 4, which further comprises a clear layer comprised of a transparent resin composition, the clear layer being provided on the surface of the substrate remote from the color layer.

6. A process for producing a decorative sheet having a three-dimensional pattern, comprising the steps of:

successively laminating a color layer and an expandable layer on a transparent substrate and drying the laminate;

applying thereon a pressure-sensitive adhesive layer with a release liner provided on the surface of the pressure-sensitive adhesive layer remote from the substrate and pressing the pressure-sensitive adhesive layer against the underlying layer including the color layer; and heating the whole laminate to foam the expandable layer in the form of a pattern.

7. The process according to claim 6, wherein the expandable layer is formed as a pattern by screen printing.

* * * * *

UNITED STATES PATENT AND TRADEMARK OFFICE
CERTIFICATE OF CORRECTION

PATENT NO. : 6,352,769 B1
DATED : March 5, 2002
INVENTOR(S) : Mori, Yutaka

It is certified that error appears in the above-identified patent and that said Letters Patent is hereby corrected as shown below:

Column 8,
Line 50, delete "to the invention" and insert in place thereof -- to the present invention --.
Line 52, delete "sheet hen" and insert in place thereof -- sheet even when --.

Signed and Sealed this

Seventh Day of October, 2003

JAMES E. ROGAN
*Director of the United States Patent and Trademark Office*